Patented Aug. 4, 1942

2,292,323

UNITED STATES PATENT OFFICE 2,292,323

WAX COATING COMPOSITION

James D. Ingle, Chicago, Ill., assignor to Industrial Patents Corporation, Chicago, Ill., a corporation of Delaware No Drawing. Application April 7, 1939,
Serial No. 266,645

15 Claims. (Cl. 99—178)

This invention relates to a method of inhibiting the growth of mold on cheese.

One of the objects of this invention is to provide an improved cheese coating composition containing a mold inhibitor.

Another object of this invention is to provide a method of solubilizing an inhibitor in a wax coating in which the inhibitor is normally insoluble.

Other objects of this invention will become apparent from the detailed description and claims which follow.

In the manufacture of cheese, the curd is normally pressed in a mold, the mold having first been partially or wholly lined with cheesecloth. After the curd has been in the mold for a sufficient length of time to set, it is removed and placed in a cooler for one to two days until a partial rind has formed on the surface. The cheese is then dipped in molten paraffin, amorphous wax, or other wax composition to provide a protective coating over the surface of the cheese to prevent drying out of the cheese and growth of mold on the surface.

Various types of amorphous waxes and wax mixtures are employed in providing the protective coating. I may employ a mixture of paraffin or other amorphous wax and a synthetic rubber resin, which is described and claimed in a copending application of James D. Ingle and Leon D. Mink, Serial No. 267,175, filed April 10, 1939.

In packaging pasteurized or processed cheese, the cheese is wrapped in a protective film or sheet, such as cellulose sheets, metal foil, and the like. I have found that in many cases, mold will grow in spite of the wrappings.

I have discovered that propionic acid normally insoluble in paraffix or wax and other types of wax-like coatings for cheese or for coating wrappers for cheese may be rendered soluble in the paraffin, wax, or wax-like coating by the addition of a small proportion of a higher fatty acid. A solution may be prepared by mixing melted paraffin or other wax, a higher fatty acid, and propionic acid.

The proportion of propionic acid and the higher fatty acid which is employed in the coating may be varied over wide limits and is dependent upon the individual requirements of the user of the coating composition. Since the propionic acid is relatively expensive and does not improve the physical properties of the wax coating, it is desirable to employ only such proportions of the acid as are necessary to impart the desired moldicidal qualities. The higher fatty acids tend to impart brittleness to the wax coatings and it is desirable, therefore, to employ only such proportions of the higher fatty acids as are necessary to render the propionic acid soluble in the wax coatings.

Representative coating compositions contain up to 1 per cent higher fatty acid, from 1 per cent to 10 per cent propionic acid, and the balance paraffin or other amorphous petroleum wax or wax compositions. It will be appreciated that the proportions of higher fatty acids and propionic acid are illustrative and that higher proportions may be employed. A typical example of a wax which is particularly effective in coating cheese directly or coating cheese wrappers contains 0.3 per cent stearic acid, 3 per cent propionic acid, and the balance paraffin or other wax composition. The paraffin or other amorphous wax is melted and the higher fatty acid added and thoroughly mixed with the melted wax. Propionic acid is then added and will dissolve quite readily in the mixture or solution of wax and higher fatty acid. The propionic acid and higher fatty acid may be added simultaneously to the wax, or the propionic acid may be added prior to the higher fatty acid.

I have found that higher fatty acids, either saturated or unsaturated, having from 8 to 26 carbon atoms in their molecules are satisfactory for rendering propionic acid soluble in amorphous petroleum waxes or wax resin mixtures. Examples of acids which are satisfactory and which are desirable since their melting points are below the boiling point of water and they will not affect appreciably the melting point of the wax coating are caprylic acid, capric acid, lauric acid, myristic acid, palmitic acid, stearic acid, and oleic acid.

The coating composition containing propionic acid may be substituted for the usual paraffin or other wax coating employed in the manufacture of cheese. In the case of processed and pasteurized cheese which is marketed in packages containing from ¼ pound to 5 pounds, the cellulose wrapper or metal foil wrapper may be coated with a thin film of the wax containing propionic acid. The coating should be applied to the surface of the wrapper which comes in contact with the cheese, but may be applied to booth surfaces, if desired.

I claim:

1. The method of dissolving propionic acid in paraffin which comprises mixing paraffin, a higher fatty acid, and propionic acid.

2. The method of dissolving propionic acid in paraffin which comprises mixing paraffin, a small proportion of stearic acid, and propionic acid.

3. The method of dissolving propionic acid in paraffin which comprises mixing paraffin, a small proportion of oleic acid, and propionic acid.

4. The method of dissolving propionic acid in paraffin which comprises mixing paraffin, a small proportion of palmitic acid, and propionic acid.

5. A wax comprising amorphous petroleum wax, a higher fatty acid, and propionic acid.

6. A wax comprising an amorphous petroleum wax, a small proportion of stearic acid, and propionic acid.

7. A wax comprising an amorphous petroleum wax, a small proportion of oleic acid, and propionic acid.

8. A wax comprising an amorphous petroleum wax, a small proportion of palmitic acid, and propionic acid.

9. A wax comprising up to 1 per cent stearic acid, from 1 per cent to 10 per cent propionic acid, and the balance amorphous petroleum wax.

10. A wax composition comprising paraffin, a higher fatty acid and propionic acid.

11. A wax composition comprising paraffin, a small proportion of a higher fatty acid and propionic acid.

12. A wax composition comprising paraffin, a small proportion of stearic acid and propionic acid.

13. A wax composition comprising up to 1 per cent stearic acid, from 1 per cent to 10 per cent propionic acid and the balance paraffin.

14. A wax composition comprising paraffin, a small proportion of oleic acid and propionic acid.

15. A wax composition comprising paraffin, a small proportion of palmitic acid and propionic acid.

JAMES D. INGLE.